(12) United States Patent
Pinheiro et al.

(10) Patent No.: US 9,693,336 B2
(45) Date of Patent: Jun. 27, 2017

(54) TECHNIQUES FOR CONNECTIONLESS SMALL DATA TRANSMISSION

(71) Applicant: Intel IP Corporation, Santa Clara, CA (US)

(72) Inventors: Ana Lucia Pinheiro, Breinigsville, PA (US); Sangeetha Bangolae, Beaverton, OR (US); Marta Martinez Tarradell, Hillsboro, OR (US); Puneet K. Jain, Hillsboro, OR (US); Hyung-Nam Choi, Hamburg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,951

(22) PCT Filed: Nov. 7, 2013

(86) PCT No.: PCT/US2013/068863
§ 371 (c)(1),
(2) Date: Dec. 28, 2013

(87) PCT Pub. No.: WO2014/133603
PCT Pub. Date: Sep. 4, 2014

(65) Prior Publication Data
US 2014/0334380 A1   Nov. 13, 2014

Related U.S. Application Data

(60) Provisional application No. 61/771,698, filed on Mar. 1, 2013.

(51) Int. Cl.
*H04W 72/00* (2009.01)
*H04B 7/04* (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC ...... H04L 45/74; H04L 5/0037; H04W 36/22; H04W 87/0486; H04B 7/0452; H04B 1/38
See application file for complete search history.

(56) References Cited

U.S. PATENT DOCUMENTS

| | | | |
|---|---|---|---|
| 6,987,770 B1 * | 1/2006 | Yonge, III | ............ H04L 1/0083 370/401 |
| 2003/0108030 A1 | 6/2003 | Gao | |

(Continued)

OTHER PUBLICATIONS

International Search Report and Written Opinion received for PCT Patent Application No. PCT/US2013/068863, mailed Feb. 7, 2014, 11 pages.

(Continued)

*Primary Examiner* — Mohammad Anwar

(57) ABSTRACT

Various embodiments are generally directed to techniques for connectionless small data transmission. In one embodiment, for example, an apparatus may comprise a processor circuit, a configuration component for execution by the processor circuit to establish a connectionless small data transmission (CSDT) mode, and a communication component for execution by the processor circuit to send a small data preamble, receive a resource allocation message identifying an assigned resource, and send a small data item in the CSDT mode using the assigned resource. Other embodiments are described and claimed.

23 Claims, 8 Drawing Sheets

(51) Int. Cl.
| | |
|---|---|
| H04B 7/0452 | (2017.01) |
| H04W 36/14 | (2009.01) |
| H04W 36/22 | (2009.01) |
| H04L 5/00 | (2006.01) |
| H04L 12/741 | (2013.01) |
| H04B 7/06 | (2006.01) |
| H04W 24/10 | (2009.01) |
| H04W 72/04 | (2009.01) |
| H04W 72/08 | (2009.01) |
| H04L 29/06 | (2006.01) |
| H04L 29/08 | (2006.01) |
| H04W 4/10 | (2009.01) |
| H04W 12/02 | (2009.01) |
| H04W 12/04 | (2009.01) |
| H04W 76/02 | (2009.01) |
| H04W 24/02 | (2009.01) |
| H04W 24/08 | (2009.01) |
| H04L 12/18 | (2006.01) |
| H04W 52/24 | (2009.01) |
| H04W 72/10 | (2009.01) |
| H04W 16/14 | (2009.01) |
| H04W 76/04 | (2009.01) |
| H04W 36/16 | (2009.01) |
| H04W 36/30 | (2009.01) |
| H04J 3/12 | (2006.01) |
| H04W 48/10 | (2009.01) |
| H04W 48/20 | (2009.01) |
| H04M 15/00 | (2006.01) |
| H04L 25/03 | (2006.01) |
| H04W 4/00 | (2009.01) |
| H04W 88/06 | (2009.01) |
| H04W 88/02 | (2009.01) |
| H04W 88/08 | (2009.01) |
| H04W 84/18 | (2009.01) |
| H04W 4/06 | (2009.01) |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/02* (2013.01); *H04W 76/023* (2013.01); *H04W 76/04* (2013.01); *H04W 76/046* (2013.01); *H04W 4/008* (2013.01); *H04W 4/06* (2013.01); *H04W 84/18* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | | |
|---|---|---|---|
| 2007/0030168 A1* | 2/2007 | Kim et al. | 340/870.07 |
| 2008/0085680 A1 | 4/2008 | Kim et al. | |
| 2008/0219236 A1* | 9/2008 | Love | H04L 5/0007 370/347 |
| 2010/0254327 A1* | 10/2010 | McBeath | H04L 1/1812 370/329 |
| 2012/0207012 A1 | 8/2012 | Kompella | |
| 2012/0208545 A1* | 8/2012 | Yang et al. | 455/450 |
| 2012/0281566 A1 | 11/2012 | Pelletier et al. | |

OTHER PUBLICATIONS

3GPP TR 23.887 V12.0.0 (Dec. 2013), "3rd Generation Partnership Project; Technical Specification Group Services and System Aspects; Study on Machine-Type Communications (MTC) and other mobile data applications communications enhancements, (Release 12)" Dec. 20, 2013 (author unknown), 151 pages.

3GPP TS 23.682 V11.0.0 (Mar. 2012), "3rd Generation Partnership Project; Technical Specification Group Services and System Aspects; Architecture enhancements to facilitate communications with packet data networks and applications (Release 11)", (Author Unknown), Mar. 12, 2012, 24 pages.

3GPP TS 36.331 V11.0.0 (Jun. 2012), 3rd Generation Partnership Project; Technical Specification Group Radio Access Network; Evolved Universal Terrestrial Radio Access (E-UTRA); Radio Resource Control (RRC); Protocol specification (Release 11), Jul. 3, 2012 (Author unknown), 302 pages.

\* cited by examiner

*FIG. 6*

Storage Medium 600

Computer Executable Instructions for 300

Computer Executable Instructions for 400

Computer Executable Instructions for 500

TECHNIQUES FOR CONNECTIONLESS SMALL DATA TRANSMISSION

RELATED CASE

This application claims priority to U.S. Provisional Patent Application No. 61/771,698, filed Mar. 1, 2013, the entirety of which is hereby incorporated by reference.

TECHNICAL FIELD

Embodiments herein generally relate to wireless broadband communications.

BACKGROUND

In a wireless communications system such as a 3rd Generation Partnership Project (3GPP) Evolved Universal Terrestrial Radio Access Network (E-UTRAN), an idle mobile device such as a user equipment (UE) that needs to transmit data to a fixed device such as an evolved node B (eNB) typically enters a connected mode and establishes a connection in order to transmit that data. In some scenarios, such as those involving machine-type communications, some network mobile devices may periodically and/or continually need to transmit small amounts of data. In various such cases, the resource overhead associated with establishing the connection may be substantial in comparison with the amount of resources used to convey the data itself. As such, techniques for connectionless small data transmission may be desirable, according to which mobile devices may transmit small data payloads without being required to establish connections.

BRIEF DESCRIPTION OF THE DRAWINGS

FIG. 6 illustrates one embodiment of a storage medium

DETAILED DESCRIPTION

Figure 1:
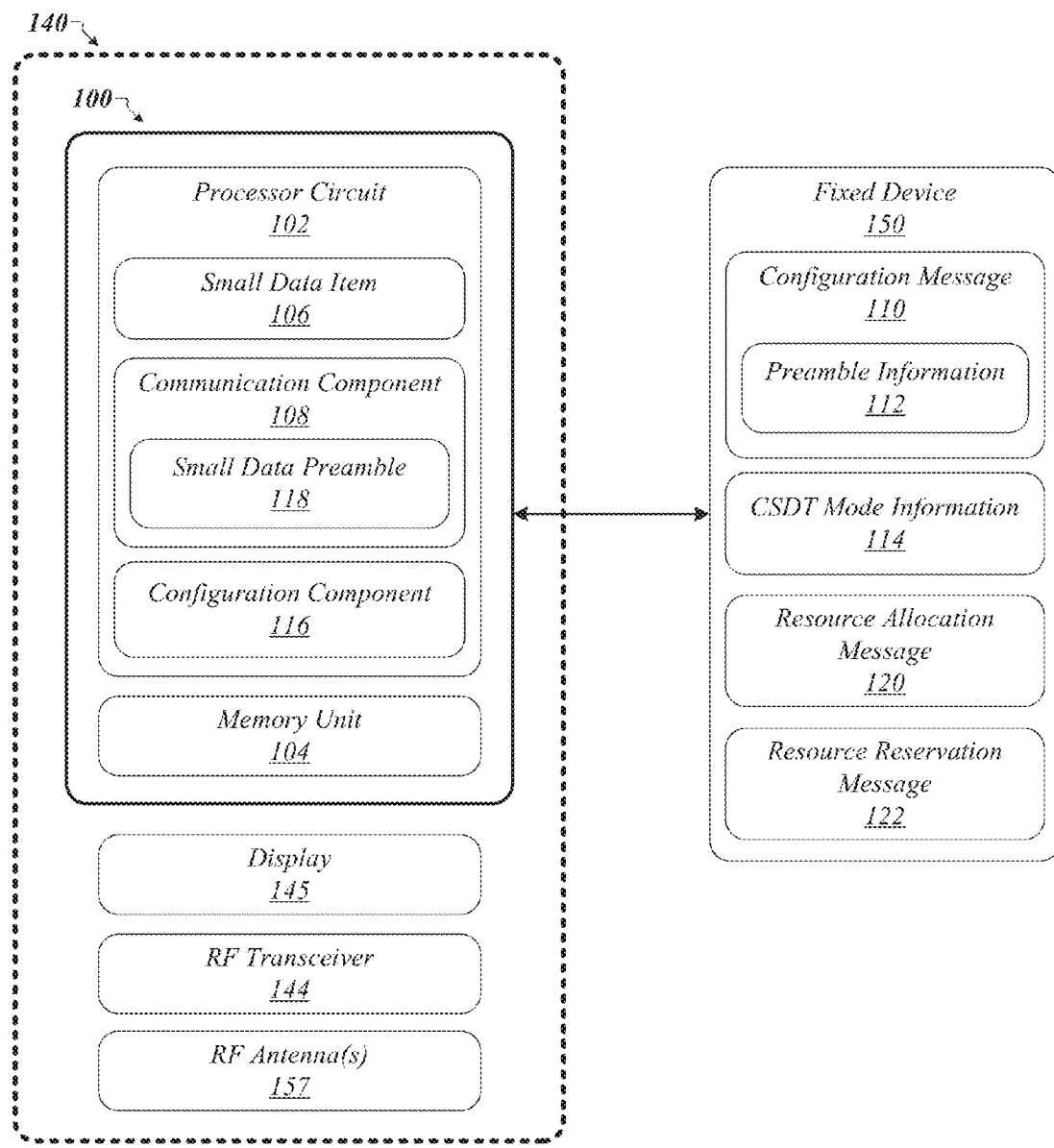
FIG. 1 illustrates one embodiment of a first apparatus and one embodiment of a first system.

Various embodiments are generally directed to techniques for connectionless small data transmission. In one embodiment, for example, an apparatus may comprise a processor circuit, a configuration component for execution by the processor circuit to establish a connectionless small data transmission (CSDT) mode, and a communication component for execution by the processor circuit to send a small data preamble, receive a resource allocation message identifying an assigned resource, and send a small data item in the CSDT mode using the assigned resource. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve wireless transmission of data using one or more wireless broadband communication technologies. For example, various embodiments may involve wireless transmissions according to one or more 3rd Generation Partnership Project (3GPP), 3GPP Long Term Evolution (LTE), and/or 3GPP LTE-Advanced (LTE-A) specifications, reports, and/or standards, including their revisions, progeny, and variants. Hereinafter, the term "3GPP embodiments" shall be employed to denote such embodiments. Some 3GPP embodiments may involve wireless transmissions according to one or more 3GPP Evolved Universal Terrestrial Radio Access specifications, reports, and/or standards ("E-UTRA specifications"). Examples of such E-UTRA specifications may include 3GPP TS 36.331 v. 11.5.0, "Evolved Universal Terrestrial Radio Access (E-UTRA) Radio Resource Control (RRC) Protocol Specification," published Sep. 9, 2013, 3GPP TS 36.321 v. 11.3.0, "Evolved Universal Terrestrial Radio Access (E-UTRA) Medium Access Control (MAC) Protocol Specification," published Jul. 3, 2013, 3GPP TS 23.401 v. 12.2.0, "General Packet Radio Service (GPRS) Enhancements for Evolved Universal Terrestrial Radio Access Network (E-UTRAN) Access," published Sep. 12, 2013, and/or their revisions, progeny, and variants. The embodiments are not limited to these examples.

Some 3GPP embodiments may involve wireless transmissions according to one or more 3GPP specifications, reports, and/or standards relating to machine-type communications ("3GPP MTC specifications"). Hereinafter, the term "3GPP MTC embodiments" shall be employed to denote such 3GPP embodiments. Examples of 3GPP MTC specifications may include 3GPP TR 23.887 v. 1.3.0, "Machine-Type and Other Mobile Data Applications—Communications Enhancements," published Oct. 3, 2013, 3GPP TS 22.368 v. 12.2.0, "Service Requirements for Machine-Type Communications (MTC)—Stage 1," published Mar. 15, 2013, 3GPP TS 23.682 v. 11.5.0, "Architecture Enhancements to Facilitate Communications with Packet Data Networks and Applications," published Sep. 12, 2013, and/or their revisions, progeny, and variants. The embodiments are not limited to these examples.

Some embodiments may additionally or alternatively involve wireless transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants. Examples of wireless broadband technologies may also include without limitation any of the Institute of Electrical and Electronics Engineers (IEEE) 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants. The embodiments are not limited in this context.

In addition to wireless transmissions, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram of an apparatus 100. Apparatus 100 may comprise an example of a mobile device that implements one or more techniques for connectionless small data transmission. In various 3GPP embodiments, apparatus 100 may comprise a UE. In some embodiments, apparatus 100 may communicate using one or more machine-type communication techniques. In various embodiments, apparatus 100 may comprise a sensor or other type of device that operates without user input and/or intervention. In some 3GPP MTC embodiments, apparatus 100 may communicate using one or more techniques for small data transmission (SDT) that relate to, for example, Section 5, "Small Data and Device Triggering Enhancements (SDDTE)" in 3GPP TR 23.887. As shown in FIG. 1, apparatus 100 comprises multiple elements including a processor circuit 102 and a memory unit 104. The embodiments, however, are not limited to the type, number, or arrangement of elements shown in this figure.

In some embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In various embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

FIG. 1 also illustrates a block diagram of a system 140. System 140 may comprise any of the aforementioned elements of apparatus 100. System 140 may further comprise one or more additional components. For example, in various embodiments, system 140 may comprise a radio frequency (RF) transceiver 144. RF transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 144 may operate in accordance with one or more applicable standards in any version. The embodiments are not limited in this context.

In some embodiments, system 140 may comprise one or more RF antennas 157. Examples of any particular RF antenna 157 may include an internal antenna, an omni-directional antenna, a monopole antenna, a dipole antenna, an end-fed antenna, a circularly polarized antenna, a microstrip antenna, a diversity antenna, a dual antenna, a tri-band antenna, a quad-band antenna, and so forth. The embodiments are not limited to these examples.

In various embodiments, system 140 may include a display 145. Display 145 may comprise any display device capable of displaying information received from processor circuit 102. Examples for display 145 may include a television, a monitor, a projector, and a computer screen. In one embodiment, for example, display 145 may be implemented by a liquid crystal display (LCD), light emitting diode (LED) or other type of suitable visual interface. Display 145 may comprise, for example, a touch-sensitive display screen ("touchscreen"). In various implementations, display 145 may comprise one or more thin-film transistors (TFT) LCD including embedded transistors. The embodiments are not limited in this context.

In general operation, apparatus 100 and/or system 140 may be operative to transmit one or more small data items 106 using techniques for connectionless small data transmission (CSDT). According to such techniques, apparatus 100 and/or system 140 may be operative to transmit one or more small data items 106 to a fixed device 150 without establishing a connection to the fixed device 150. For example, in some 3GPP embodiments, fixed device 150 may comprise an evolved node B (eNB), and apparatus 100 and/or system 140 may transmit one or more small data items 106 to the eNB without establishing a radio resource control (RRC) connection to the eNB. The embodiments are not limited to this example.

In various embodiments, apparatus 100 and/or system 140 may perform CSDT in conjunction with a CSDT scheme according to which a process for establishing a connection to a fixed device is adapted to enable transmission of a small data item without establishing a connection. In some such embodiments, a process for establishing a connection to fixed device 150 may comprise transmitting a connection request, and the process may be adapted such that a small data item 106 may be transmitted in lieu of the connection request. For example, in various 3GPP embodiments, a process for establishing an RRC connection may be adapted such that a small data item 106 may be transmitted in lieu of an RRCConnectionRequest. In some embodiments, the connection establishment process may involve transmitting a preamble and receiving a resource allocation message that identifies one or more radio resources allocated for use in transmitting the connection request. For example, in various 3GPP embodiments, the RRC connection establishment process may involve transmitting a random access channel (RACH) preamble and receiving a Random Access Response identifying an allocated physical uplink shared channel (PUSCH) resource. The embodiments are not limited in this context.

In some embodiments, apparatus 100 and/or system 140 may comprise a communication component 108. Communication component 108 may comprise logic, circuitry, and/or instructions operative to send messages to fixed device 150 and/or to receive messages from fixed device 150. In various embodiments, communication component 108 may be operative to send and/or receive messages via RF transceiver 144 and one or more RF antennas 157. In some embodiments, communication component 108 may be operative to generate and/or process messages according to one or more wireless communications standards. For example, in various 3GPP embodiments, communication component 108 may be operative to generate and/or process messages according to one or more 3GPP specifications, which may include E-UTRA specifications and/or 3GPP MTC specifications. The embodiments are not limited in this context.

In some embodiments, communication component 108 may be operative to receive a configuration message 110 from fixed device 150. In various embodiments, configuration message 110 may comprise preamble information 112 identifying a set of one or more small data preambles. Each small data preamble may comprise a preamble that fixed device 150 has assigned for use in CSDT, and that may be transmitted to fixed device 150 in order to indicate that a small data item 106 will be transmitted using CSDT. In some embodiments, configuration message 110 may comprise a broadcast message. In various embodiments, configuration message 110 may comprise a configuration message for a random access channel. For example, in some 3GPP embodiments, configuration message 110 may comprise an RACH-ConfigCommon message. In various embodiments, the one or more small data preambles may comprise a subset of a predefined set of preambles. For example, in some 3GPP embodiments, the one or more small data preambles may comprise a subset of a set of random access (RA) preambles defined in a RACH-ConfigCommon message. In various embodiments, the one or more preambles may comprise a range of preambles within the predefined set. In some such embodiments, preamble information 112 may comprise a start parameter identifying a first preamble in the range and a range parameter indicating a number of preambles in the range. The embodiments are not limited in this context.

In various embodiments, communication component 108 may be operative to exchange one or more messages with fixed device 150 in order to register apparatus 100 and/or system 140 with fixed device 150. For example, in some 3GPP embodiments, communication component 108 may be operative to exchange one or more messages with fixed device 150 in conjunction with the performance of an Attach procedure or a Tracking Area Update (TAU) procedure. In various embodiments, in the course of registering apparatus 100 and/or system 140 with fixed device 150, communication component 108 may be operative to receive CSDT mode information 114 from fixed device 150. CSDT mode information 114 may comprise information explicitly or implicitly indicating that fixed device 150 expects to receive connectionless small data transmissions from remote device apparatus 100 and/or system 140. Examples of CSDT mode information 114 may include an acknowledgment of a request for connectionless data transfer, an acceptance of an attachment request, and a TAU response. The embodiments are not limited in this context.

In some embodiments, apparatus 100 and/or system 140 may comprise a configuration component 116. Configuration component 116 may comprise logic, circuitry, and/or instructions operative to configure operations of apparatus 100 and/or system 140 based on messages received from fixed device 150 via communication component 108. In various embodiments, configuration component 116 may be operative to instruct communication component 108 to send one or more messages to fixed device 150 in conjunction with registration of apparatus 100 and/or system 140. For example, in some 3GPP embodiments, configuration component 116 may be operative to instruct communication component 108 to send one or more messages to fixed device 150 in conjunction with the performance of an Attach procedure or a Tracking Area Update (TAU) procedure. The embodiments are not limited in this context.

In various embodiments, configuration component 116 may be operative to configure apparatus 100 and/or system 140 based on one or more messages received from fixed device 150 during registration of apparatus 100 and/or system 140. In some such embodiments, configuration component 116 may be operative to configure apparatus 100 and/or system 140 in a CSDT mode based on CSDT mode information 114 received during registration. For example, in various 3GPP embodiments, communication component 108 may be operative to receive CSDT mode information 114 during an Attach procedure or TAU procedure, and configuration component 116 may be operative to configure apparatus 100 and/or system 140 in a CSDT mode based on that CSDT mode information 114. The embodiments are not limited to this example.

In some embodiments, apparatus 100 and/or system 140 may be operative to generate one or more small data items 106. In various embodiments, apparatus 100 and/or system 140 may be operative to generate small data items 106 periodically, at regular intervals. For example, in some embodiments, apparatus 100 and/or system 140 may comprise a sensor that periodically generates small data items 106 comprising sensor readings. In various embodiments, any particular small data item 106 may comprise information generated by processor circuit 102 and/or stored in memory unit 104. The embodiments are not limited in this context.

It is worthy of note that the sizes of data items that constitute small data items 106 may vary from implementation to implementation, based on design considerations and other factors. In some embodiments, one or more parameters of a CSDT scheme may define permissible sizes of small data items 106. In various embodiments, such parameters may be selected in conjunction with one or more wireless communications standards and/or specifications. For example, in some 3GPP MTC embodiments, parameters defining permissible sizes of small data items 106 may be selected in conjunction with CSDT techniques associated with 3GPP TR 23.887. The embodiments are not limited in this context.

In various embodiments, communication component 108 may be operative to identify a small data item 106 to be transmitted to fixed device 150 using CSDT. In some embodiments, the small data item 106 may comprise information generated by one or more components of apparatus 100 and/or system 140, such as processor circuit 102. In various embodiments, the small data item 106 may comprise one of a plurality of small data items 106 generated at regular intervals. The embodiments are not limited in this context.

In some embodiments, communication component 108 may be operative to send a small data preamble 118 to fixed device 150 in order to indicate that it will subsequently send a small data item 106 to fixed device 150. In various embodiments, communication component 108 may be operative to send the small data preamble 118 over a random access channel. In some embodiments, communication component 108 may be operative to select small data preamble 118 from among a set of small data preambles in preamble information 118. In various embodiments, preamble information 112 may identify a single set of small data preambles, and communication component 108 may be operative to randomly select small data preamble 118 from among that set.

In some other embodiments, preamble information 112 may identify multiple sets of small data preambles, and communication component 108 may be operative to select one of the multiple sets and then randomly select small data preamble 118 from among the selected set. In various embodiments, preamble information 112 may identify multiple sets of small data preambles, and each set may correspond to a different range of possible sizes for small data item 106. In an example 3GPP embodiment, an RACH-ConfigCommon message may comprise preamble information 112 that includes RACH-ConfigDataSmall fields defining a set of small data preambles for use with small data items 106 of sizes less than 256 bits, RACH-ConfigDataMedium fields defining a set of small data preambles for use with small data items 106 of sizes between 256 bits and 1280 bits, and RACH-ConfigDataLarge fields defining a set of small data preambles for use with small data items 106 of sizes between 1280 and 6400 bits. These are exemplary values and it is to be understood that any range may be chosen. In some embodiments, communication component 108 may be operative to select a preamble set based on the size of the small data item 106 to be transmitted and then to randomly select a small data preamble 112 from among those in the selected preamble set. The embodiments are not limited in this context.

In various embodiments, communication component 108 may be operative to receive a resource allocation message 120 from fixed device 150 in response to small data preamble 118. Resource allocation message 120 may comprise information identifying one or more radio resources that have been assigned for use by apparatus 100 and/or system 140 to transmit small data item 106 to fixed device 150. In some embodiments, resource allocation message 120 may identify radio resources associated with a particular uplink channel. For example, in various 3GPP embodiments, resource allocation message 120 may identify one or more PUSCH resource blocks that have been allocated to apparatus 100 and/or system 140 for transmission of small data item 106. The embodiments are not limited to this example.

In some embodiments, once it receives resource allocation message 120, communication component 108 may be operative to send small data item 106 to fixed device 150 using one or more assigned resources identified in resource allocation message 120. In various embodiments, communication component 108 may wait for an acknowledgement message from fixed device 150. For example, in some 3GPP embodiments, communication component 108 may be operative to monitor a physical hybrid automatic repeat request (ARQ) indicator channel (PHICH) for an acknowledgment (ACK) message from fixed device 150. In various embodiments, if communication component 108 does not receive an acknowledgment message from fixed device 150, it may be operative to perform a backoff procedure and then to retransmit small data preamble 118. The embodiments are not limited in this context.

In some embodiments, apparatus 100 and/or system 140 may alternatively or additionally perform CSDT in conjunction with a CSDT scheme according to which fixed device 150 automatically reserves radio resources for small data transmissions on the part of apparatus 100 and/or system 140. In various embodiments, fixed device 150 may reserve such resources without requiring that apparatus 100 and/or system 140 transmit a small data preamble 118. In some embodiments, the reserved resources may not be reserved exclusively for use by apparatus 100 and/or system 140, but rather may be reserved for use by other devices as well. In various embodiments, the reserved radio resources may be associated with a particular uplink channel. For example, in some 3GPP embodiments, resource reservation message 122 may identify one or more PUSCH resource blocks that have been reserved for apparatus 100 and/or system 140. The embodiments are not limited to this example.

In various embodiments, fixed device 150 may be operative to transmit a resource reservation message 122 that comprises information identifying one or more specific radio resources that have been reserved for use by apparatus 100 and/or system 140 to transmit small data using CSDT. In some embodiments, the resource reservation message 122 may comprise a unicast message. In some embodiments, communication component 108 may be operative to receive resource reservation message 122 and to identify the one or more specific reserved resources. In various embodiments, resource reservation message 122 may indicate a repeating pattern that describes the one or more specific reserved resources. In some 3GPP embodiments, for example, resource reservation message 122 may indicate that for each in a series of radio frames, physical resource blocks in a particular subframe have been reserved for CSDT by apparatus 100 and/or system 140. In various 3GPP embodiments, fixed device 150 may transmit resource reservation message 122 to apparatus 100 and/or system 140 during an Attach procedure or a TAU procedure. In some embodiments, resource reservation message 122 may reflect resource reservations that apply to apparatus 100 and/or system 140 until fixed device 150 transmits a subsequent resource reservations message 122. In various other embodiments, resource reservation message 122 may reflect resource reservations that expire after a certain period of time. In some such embodiments, fixed device 150 may signal the expiration of this period of time to apparatus 100 and/or system 140 via dedicated or common signaling. The embodiments are not limited in this context.

In various embodiments, when communication component 108 identifies a small data item 106 to be transmitted to fixed device 150 using CSDT, it may identify one or more reserved resources based on a most recently received resource reservation message 122. In some embodiments, communication component 108 may then send small data item 106 to fixed device 150 using the one or more reserved resources. For example, in various 3GPP embodiments, communication component 108 may be operative to send small data item 106 to fixed device 150 using one or more reserved PUSCH resources. In some embodiments, communication component 108 may wait for an acknowledgement message from fixed device 150. For example, in various 3GPP embodiments, communication component 108 may be operative to monitor PHICH for an ACK message from fixed device 150. In some embodiments, if communication component 108 does not receive an acknowledgment message from fixed device 150, it may be operative to perform a backoff procedure and then to retransmit small data item 106 using reserved resources in a subsequent frame and/or subframe. The embodiments are not limited in this context.

In various embodiments, prior to sending the small data item 106, communication component 108 may be operative to determine an initial transmit power for transmission of small data item 106. In some embodiments, communication component 108 may be operative to determine the initial transmit power based on channel quality measurements. In various embodiments, communication component 108 may be operative to receive a reference signal from fixed device 150 and to determine the initial transmit power based on a quality with which it receives the reference signal. In some embodiments, the reference signal may comprise a broadcast signal. The embodiments are not limited to this example.

In some embodiments, apparatus 100 and/or system 140 may alternatively or additionally perform CSDT in conjunction with a CSDT scheme according to which fixed device 150 automatically reserves radio resources for small data transmissions on the part of a plurality of network devices as a whole. According to such a CSDT scheme, rather than particular resources being assigned to particular devices, a pool of resources may be reserved for use by a group of devices. As such, in various embodiments, resource reservation message 122 may not specify subframes that are reserved for apparatus 100 and/or system 140 particularly, but rather may identify a pool of reserved resources, which may comprise physical resource blocks that have been reserved across the subframes of a series of frames. In some such embodiments, resource reservation message 122 may comprise a broadcast message. In some embodiments, communication component 108 may be operative to randomly select one or more reserved resources from among the pool of reserved resources identified by resource reservation message 122, and to transmit small data item 106 using the randomly selected resources. The embodiments are not limited in this context.

Figure 2:
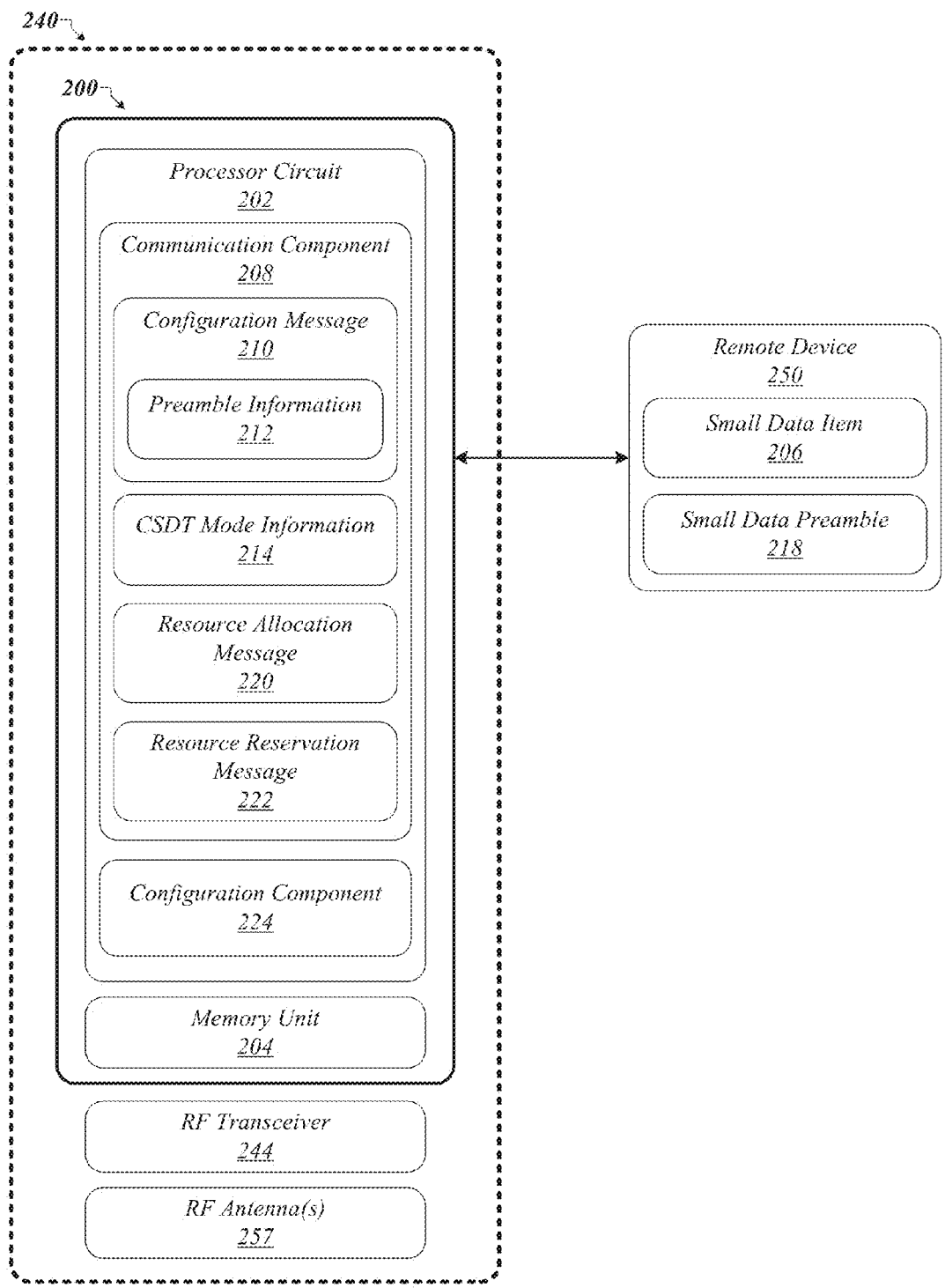
FIG. 2 illustrates one embodiment of a second apparatus and one embodiment of a second system.

FIG. 2 illustrates a block diagram of an apparatus 200. Apparatus 200 may comprise an example of a fixed device that implements one or more CSDT techniques. In various 3GPP embodiments, apparatus 200 may comprise an evolved node B (eNB). In some embodiments, apparatus 200 may communicate using one or more machine-type communication techniques. In various 3GPP MTC embodiments, apparatus 200 may communicate using one or more techniques for small data transmission (SDT) that relate to, for example, Section 5, "Small Data and Device Triggering Enhancements (SDDTE)" in 3GPP TR 23.887. As shown in FIG. 2, apparatus 200 comprises multiple elements including a processor circuit 202 and a memory unit 204. The embodiments, however, are not limited to the type, number, or arrangement of elements shown in this figure.

In some embodiments, apparatus 200 may comprise processor circuit 202. Processor circuit 202 may be implemented using any processor or logic device, and may be the same as or similar to processor circuit 102 of FIG. 1. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory, and may be the same as or similar to memory unit 104 of FIG. 1. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

FIG. 2 also illustrates a block diagram of a system 240. System 240 may comprise any of the aforementioned elements of apparatus 200. System 240 may further comprise one or more additional components. For example, in various embodiments, system 240 may comprise a radio frequency (RF) transceiver 244. RF transceiver 244 may include one or more radios capable of transmitting and receiving signals using various suitable wireless communications techniques, and may be the same as or similar to RF transceiver 144 of FIG. 1. The embodiments are not limited in this context.

In some embodiments, system 240 may comprise one or more RF antennas 257. Examples of any particular RF antenna 257 may include an internal antenna, an omni-directional antenna, a monopole antenna, a dipole antenna, an end-fed antenna, a circularly polarized antenna, a microstrip antenna, a diversity antenna, a dual antenna, a tri-band antenna, a quad-band antenna, and so forth. The embodiments are not limited to these examples.

In general operation, apparatus 200 and/or system 240 may be operative to receive small data items 206 from one or more remote devices using CSDT techniques. According to such techniques, apparatus 200 and/or system 240 may be operative to receive one or more small data items 206 from one or more remote devices 250 that have not established connections to apparatus 200 and/or system 240. For example, in some 3GPP embodiments, apparatus 200 may comprise an eNB that receives small data items 206 from one or more UEs that have not established RRC connections to apparatus 200. Hereinafter, for simplicity, elements of apparatus 200 and system 240 shall be discussed in the context of CSDT on the part of the single remote device 250 illustrated in FIG. 2. However, it is to be understood that apparatus 200 and/or system 240 may be operative to communicate with a plurality of devices using the described techniques, and the embodiments are not limited in this context.

In various embodiments, apparatus 200 and/or system 240 may comprise a communication component 208. Communication component 208 may comprise logic, circuitry, and/or instructions operative to send messages to remote device 250 and/or to receive messages from remote device 250. In some embodiments, communication component 208 may be operative to send and/or receive messages via RF transceiver 244 and one or more RF antennas 257. In various embodiments, communication component 208 may be operative to generate and/or process messages according to one or more wireless communications standards. For example, in some 3GPP embodiments, communication component 208 may be operative to generate and/or process messages according to one or more 3GPP specifications, which may include E-UTRA specifications and/or 3GPP MTC specifications. The embodiments are not limited in this context.

In various embodiments, apparatus 200 and/or system 240 may comprise a configuration component 224. Configuration component 224 may comprise logic, circuitry, and/or instructions operative to assign and/or reserve radio resources for receiving CSDT transmissions from one or more remote devices according to one or more CSDT schemes. In some embodiments, configuration component 224 may be operative to assign and/or reserve one or more resources of a physical uplink channel that is shared by multiple remote devices. For example, in various 3GPP embodiments, configuration component 224 may be operative to assign and/or reserve one or more PUSCH resources for CSDT transmissions. The embodiments are not limited to this example.

In some embodiments, configuration component 224 may be operative to assign one or more radio resources to remote device 250 in conjunction with a CSDT scheme according to which a process for establishing a connection to apparatus 200 is adapted to enable transmission of a small data item without establishing a connection. In various embodiments, the connection establishment process may involve remote device 250 transmitting a preamble and receiving a resource allocation message that identifies one or more radio resources allocated for use in transmitting the connection request. In some such embodiments, according to the CSDT scheme, remote device 250 may transmit a small data preamble and use the one or more subsequently assigned radio resources to transmit small data rather than using them to transmit a connection request. The embodiments are not limited in this context.

In various embodiments, configuration component 224 may be operative to select one or more sets of preambles for use as small data preambles. In some embodiments, each of the one or more sets of small data preambles may comprise a subset of a predefined set of preambles. For example, in various 3GPP embodiments, each of the one or more sets of small data preambles may comprise a subset of a set of RA preambles. In some embodiments, each of the one or more sets of small data preambles may comprise a range of preambles within the predefined set. In various embodiments, configuration component 224 may be operative to select a single set of small data preambles. In some other embodiments, configuration component 224 may be operative to select multiple sets of small data preambles, and each set may correspond to a different range of possible sizes of small data items 206. The embodiments are not limited in this context.

In various embodiments, communication component 208 may be operative to transmit a configuration message 210 to remote device 250. In some embodiments, configuration message 210 may comprise preamble information 212 identifying the one or more sets of small data preambles selected by configuration component 224. In various embodiments, configuration message 210 may comprise a broadcast message that is transmitted to multiple remote devices. In some embodiments, configuration message 210 may comprise a configuration message for a random access channel. For example, in various 3GPP embodiments, configuration message 210 may comprise an RACH-ConfigCommon message. In some embodiments, each sets of small data preambles may comprise a range of preambles within a predefined set. In various such embodiments, the preamble information 212 may comprise, for each set of small data preambles, a start parameter identifying a first preamble in that range and a range parameter identifying a number of preambles in that range. The embodiments are not limited in this context.

In some embodiments, communication component 208 may be operative to exchange one or more messages with remote device 250 during registration of remote device 250. For example, in various 3GPP embodiments, communication component 208 may be operative to exchange one or more messages with remote device 250 in conjunction with the performance of an Attach procedure or a Tracking Area Update (TAU) procedure. In some embodiments, in the course of registering remote device 250, communication component 208 may be operative to transmit CSDT mode information 214 to remote device 250. CSDT mode information 214 may comprise information explicitly or implicitly indicating that apparatus 200 expects to receive connectionless small data transmissions from remote device 250. Examples of CSDT mode information 214 may include an acknowledgment of a request for connectionless data transfer, an acceptance of an attachment request, and a TAU response. The embodiments are not limited to these examples.

In various embodiments, communication component 208 may be operative to receive a small data preamble 218 from remote device 250. In some embodiments, the small data preamble 218 may comprise one of the small data preambles identified in preamble information 212. In various embodiments, based on a CSDT scheme, the small data preamble 218 may indicate that the remote device 250 will be transmitting a small data item 206. In some embodiments, communication component 208 may be operative to receive the small data preamble 218 from remote device 250 over a random access channel. The embodiments are not limited in this context.

In various embodiments, based on small data preamble 218, configuration component 224 may be operative to assign one or more radio resources to remote device 250 for use in transmitting small data item 206 to apparatus 200 and/or system 240. In some embodiments, the one or more assigned resources may comprise resources of a particular uplink channel. For example, in various 3GPP embodiments, the one or more assigned resources may comprise one or more resource blocks in one or more PUSCH subframes and/or frames. In some embodiments, configuration component 224 may be operative to determine a size range of small data item 206 based on small data preamble 218 and to assign the one or more radio resources based on that size range. For example, in various embodiments, configuration message 210 may define multiple sets of small data preambles corresponding to different size ranges, and configuration component 224 may be operative to determine a size range of the small data item 206 by identifying a set in which small data preamble 218 resides. In an example 3GPP embodiment, configuration message 210 may comprise an RACH-ConfigCommon message that includes RACH-ConfigDataSmall, RACH-ConfigDataMedium, and RACH-ConfigDataLarge preamble sets, and configuration component 224 may be operative to determine a size range of small data item 206 by identifying which of these sets comprises small data preamble 218. The embodiments are not limited in this context.

In some embodiments, communication component 208 may be operative to transmit a resource allocation message 220 to remote device 250 in response to small data preamble 218. Resource allocation message 220 may comprise information identifying the one or more radio resources that configuration component 224 has assigned for use by remote device 250 to transmit small data item 206. In various embodiments, resource allocation message 220 may identify one or more resources of a particular uplink channel. For example, in some 3GPP embodiments, resource allocation message 220 may identify one or more resource blocks in one or more PUSCH subframes and/or frames. In some embodiments, communication component 208 may be operative to a connectionless transmission comprising small data item 206 from remote device 250 via the one or more assigned resources identified in resource allocation message 220. In various embodiments, communication component 208 may then be operative to transmit an acknowledgment message to remote device 250 to indicate that it has received small data item 206. The embodiments are not limited in this context.

In some embodiments, apparatus 200 and/or system 240 may alternatively or additionally be operative to implement a CSDT scheme according to which it automatically reserves radio resources for small data transmissions on the part of remote device 250 and/or one or more other remote devices. In various embodiments, configuration component 224 may be operative to reserve such resources for each of a plurality of remote devices operating in a CSDT mode. In some embodiments, configuration component 224 may be operative to reserve such resources without requiring that remote device 250 transmit small data preamble 218. In various embodiments, configuration component 224 may be operative to reserve resources for CSDT transmissions of a plurality of remote devices in such fashion that particular resources are not reserved exclusively for single remote devices, but rather are reserved for use by any or all of multiple remote devices. In some embodiments, the reserved radio resources may be associated with a particular uplink channel. For example, in various 3GPP embodiments, the reserved resources may comprise physical resource blocks in one or more PUSCH subframes and/or frames. The embodiments are not limited in this context.

In some embodiments, configuration component 224 may be operative to reserve resources for CSDT on an individualized basis, according to which specific reserved resources are assigned to each remote device operating in the CSDT mode. In various such embodiments, the same specific resources may be assigned to multiple remote devices. In some such embodiments, the reserved resources assigned to any particular remote device may follow a repeating pattern. For example, in various embodiments, configuration component 224 may be operative to reserve resource blocks in a particular subframe of each of a series of frames for use by a particular remote device for CSDT. In some other embodiments, configuration component 224 may be operative to reserve resources for CSDT on a collective basis, according to which a pool of resources is reserved for small data transmissions on the part of a plurality of remote devices as a whole. In various such embodiments, a remote device performing CSDT may randomly select one or more resources from among the pool and use those resources to transmit small data. The embodiments are not limited in this context.

In some embodiments, communication component 208 may be operative to transmit a resource reservation message 222 to remote device 250. In various embodiments in which configuration component 224 reserves resources for CSDT on an individualized basis, resource reservation message 222 may comprise a unicast message addressed specifically to remote device 250, and may identify specific reserved resources for use by remote device 250 in performing CSDT. In some such embodiments, resource reservation message 222 may indicate that physical resource blocks in a particular subframe of each of a series of frames are reserved for use by remote device 250. In various embodiments in which configuration component 224 reserves resources for CSDT on a collective basis, resource reservation message 222 may comprise a broadcast message addressed to a plurality of remote devices that includes remote device 250, and may identify a pool of reserved resources for use by the plurality of remote devices in performing CSDT. In some embodiments, communication component 208 may be operative to receive a connectionless transmission comprising small data item 206 from remote device 250 via one or more reserved resources identified in resource reservation message 222. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
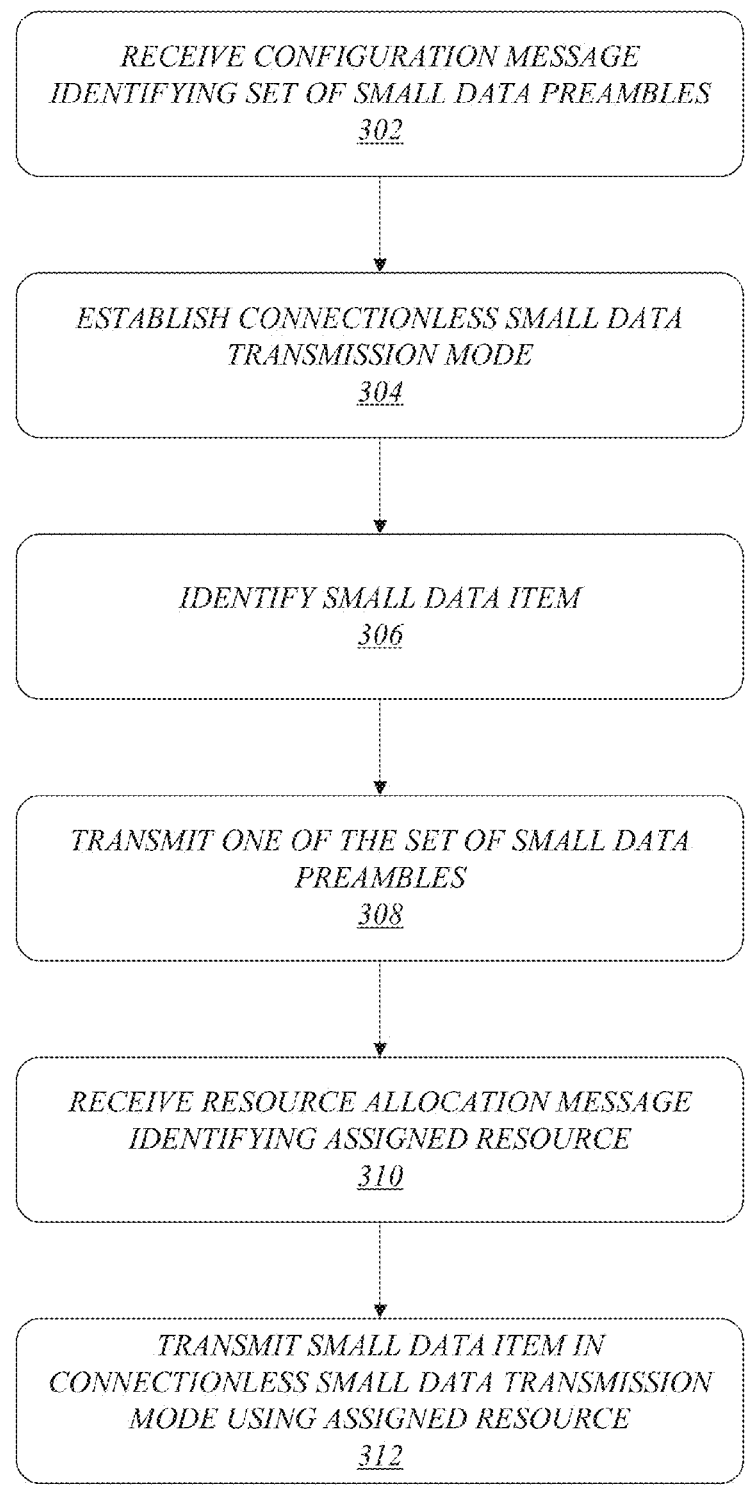
FIG. 3 illustrates one embodiment of a first logic flow.

FIG. 3 illustrates one embodiment of a logic flow 300, which may be representative of the operations executed by one or more embodiments described herein. More particularly, logic flow 300 may comprise an example of operations that apparatus 100 and/or system 140 of FIG. 1 may perform in conjunction with a CSDT scheme that employs small data preambles. As shown in FIG. 3, a configuration message identifying a set of small data preambles may be received at 302. For example, communication component 108 of FIG. 1 may be operative to receive a configuration message 110 comprising preamble information 112 that identifies a set of small data preambles. At 304, a connectionless small data transmission mode may be established. For example, configuration component 116 of FIG. 1 may be operative to establish a CSDT mode by performing one or more operations based on CSDT mode information 114. At 306, a small data item may be identified for transmission using CSDT. For example, communication component 108 of FIG. 1 may be operative to identify small data item 106 for transmission to fixed device 150 using CSDT.

At 308, one of the set of small data preambles may be transmitted. For example, communication component 108 of FIG. 1 may be operative to transmit a small data preamble 118 to fixed device 150. At 310, a resource allocation message may be received that identifies an assigned resource for use in CSDT transmission of the small data item. For example, communication component 108 of FIG. 1 may be operative to receive a resource allocation message 120 that identifies an assigned resource for use in CSDT transmission of small data item 106. At 312, the small data item may be transmitted in the connectionless small data transmission mode using the assigned resource. For example, communication component 108 of FIG. 1 may be operative to transmit small data item 106 to fixed device 150 in the CSDT mode using the assigned resource identified in resource allocation message 120. The embodiments are not limited to these examples.

Figure 4:
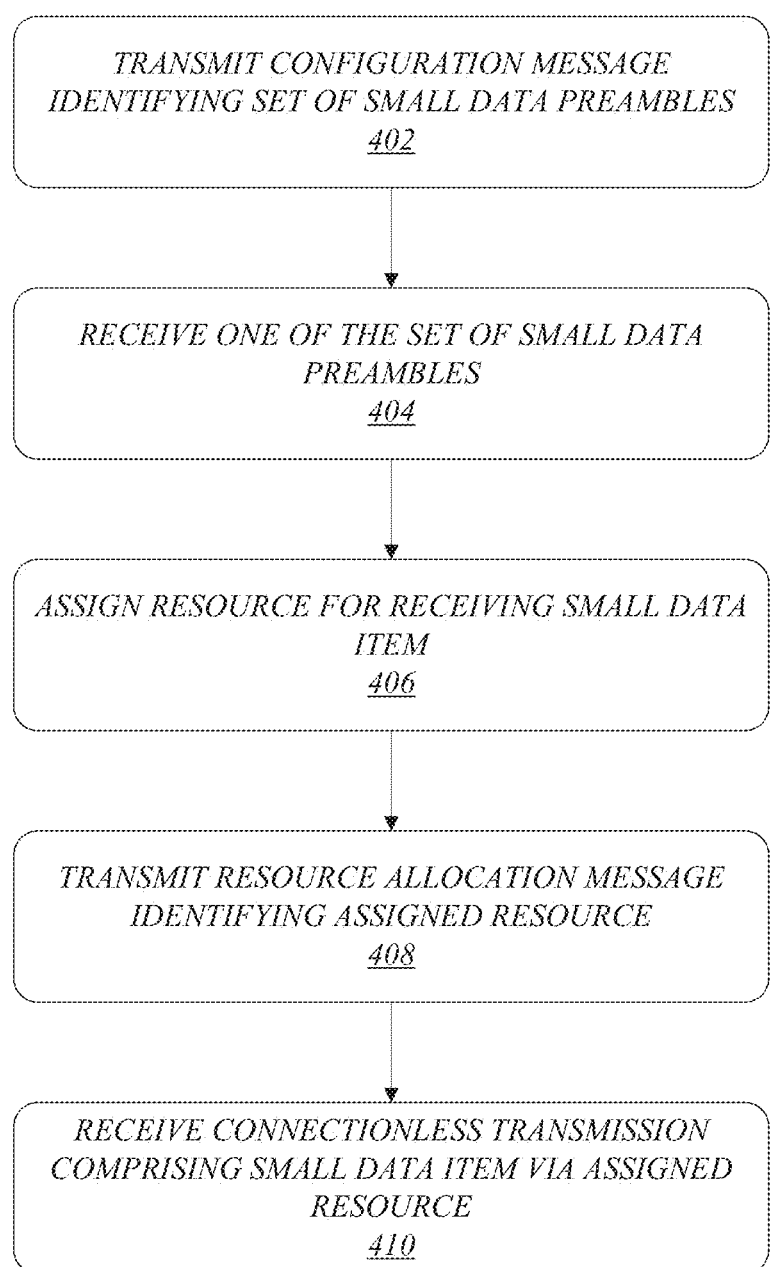
FIG. 4 illustrates one embodiment of a second logic flow.

FIG. 4 illustrates one embodiment of a logic flow 400, which may be representative of the operations executed by one or more embodiments described herein. More particularly, logic flow 400 may comprise an example of operations that apparatus 200 and/or system 240 of FIG. 2 may perform in conjunction with a CSDT scheme that employs small data preambles. As shown in FIG. 4, a configuration message identifying a set of small data preambles may be transmitted at 402. For example, communication component 208 of FIG. 2 may be operative to transmit a configuration message 210 comprising preamble information 212 that identifies a set of small data preambles. At 404, one of the set of small data preambles may be received. For example, communication component 208 of FIG. 2 may be operative to receive one of the set of small data preambles identified by the preamble information 212 in the configuration message 210.

At 406, a resource may be assigned for receiving a small data item. For example, configuration component 224 of FIG. 2 may be operative to assign a resource for receiving small data item 206 from remote device 250 via CSDT. At 408, a resource allocation message may be transmitted that identifies the assigned resource. For example, communication component 208 of FIG. 2 may be operative to transmit a resource allocation message 220 to remote device 250 that identifies the assigned resource for receiving small data item 206 from remote device 250. At 410, a connectionless transmission comprising the small data item may be received via the assigned resource. For example, communication component 208 of FIG. 2 may be operative to receive a connectionless transmission comprising small data item 206 via the resource assigned for receiving small data item 206 from remote device 250. The embodiments are not limited to these examples.

Figure 5:
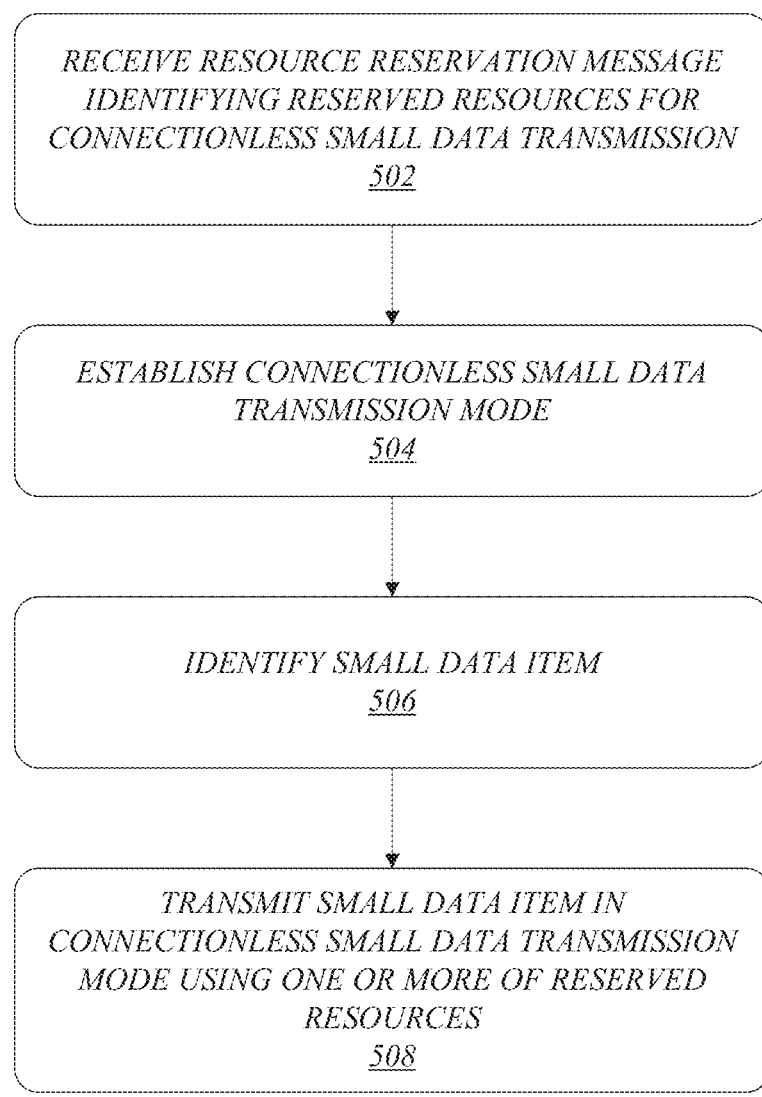
FIG. 5 illustrates one embodiment of a third logic flow.

FIG. 5 illustrates one embodiment of a logic flow 500, which may be representative of the operations executed by one or more embodiments described herein. More particularly, logic flow 500 may comprise an example of operations that apparatus 100 and/or system 140 of FIG. 1 may perform in conjunction with a CSDT scheme according to which fixed device 150 automatically reserves resources for CSDT transmissions. As shown in FIG. 5, a resource reservation message that identifies reserved resources for CSDT may be received at 502. For example, communication component 108 of FIG. 1 may be operative to receive resource reservation message 122 from fixed device 150. At 504, a connectionless small data transmission mode may be established. For example, configuration component 116 of FIG. 1 may be operative to establish a CSDT mode by performing one or more operations based on CSDT mode information 114. At 506, a small data item may be identified for transmission using CSDT. For example, communication component 108 of FIG. 1 may be operative to identify small data item 106 for transmission to fixed device 150 using CSDT. At 508, the small data item may be transmitted in the connectionless small data transmission mode using one or more of the reserved resources. For example, communication component 108 of FIG. 1 may be operative to transmit small data item 106 to fixed device 150 in the CSDT mode using one or more reserved resources identified in resource reservation message 122. The embodiments are not limited to these examples.

FIG. 6 illustrates an embodiment of a storage medium 600. The storage medium 600 may comprise an article of manufacture. In one embodiment, the storage medium 600 may comprise any non-transitory computer readable medium or machine readable medium, such as an optical, magnetic or semiconductor storage. The storage medium may store various types of computer executable instructions, such as instructions to implement one or more of logic flows 300, 400, and/or 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 7:
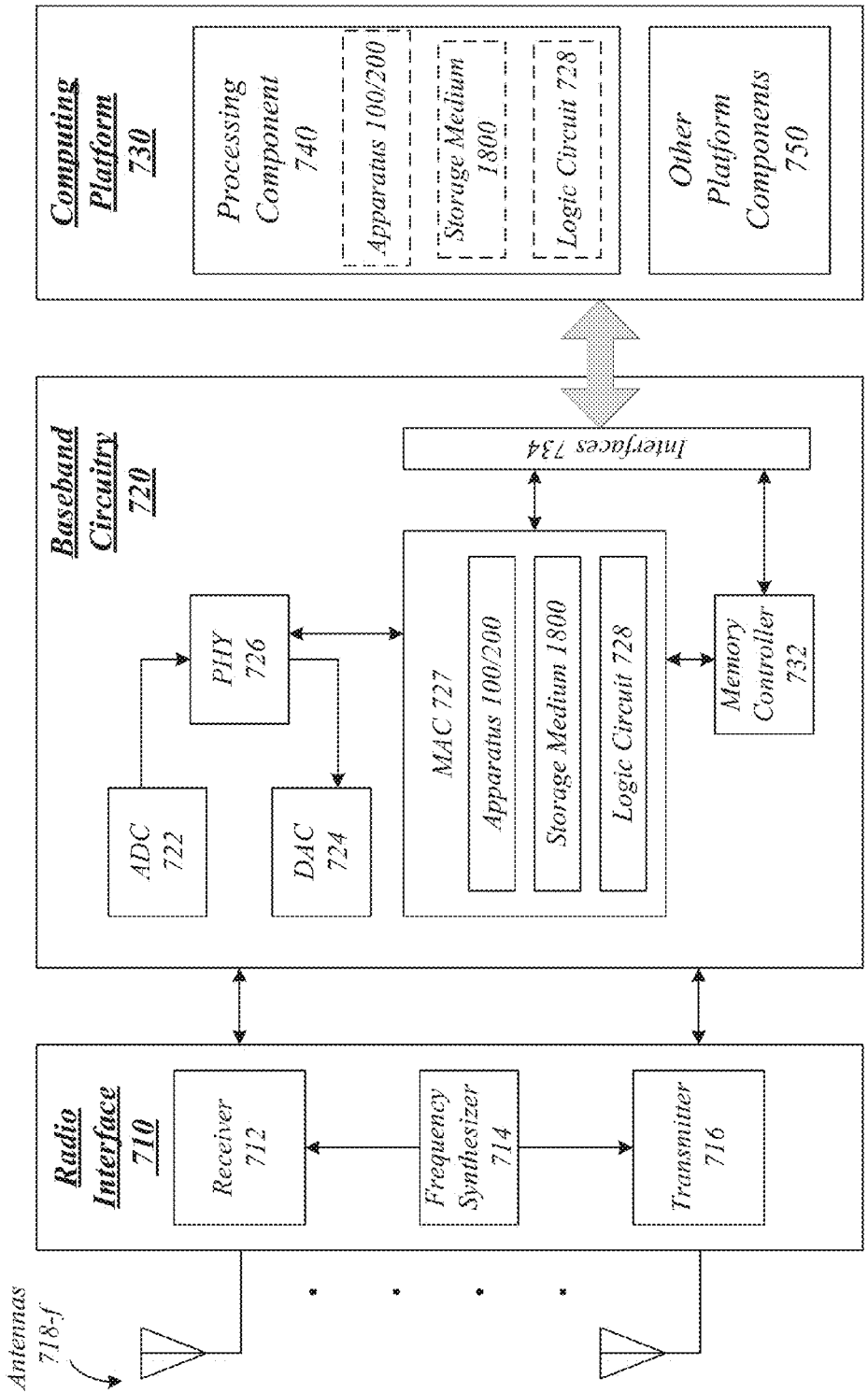
FIG. 7 illustrates one embodiment of a computing architecture.

FIG. 7 illustrates an embodiment of a device 700 for use in a broadband wireless access network. Device 700 may implement, for example, apparatus 100, system 140, apparatus 200, system 240, storage medium 600 and/or a logic circuit 728. The logic circuit 728 may include physical circuits to perform operations described for apparatus 100 or apparatus 200, for example. As shown in FIG. 7, device 700 may include a radio interface 710, baseband circuitry 720, and computing platform 730, although the embodiments are not limited to this configuration.

The device 700 may implement some or all of the structure and/or operations for the apparatus 100, system 140, apparatus 200, system 240, storage medium 600, and/or logic circuit 728 in a single computing entity, such as entirely within a single device. Alternatively, the device 700 may distribute portions of the structure and/or operations for the apparatus 100, system 140, apparatus 200, system 240, storage medium 600, and/or logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-*f*. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames and/or packets. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for the apparatus 100, system 140, apparatus 200, system 240, storage medium 600, and/or logic circuit 728 using the processing component 740. The processing component 740 (and/or PHY 726 and/or MAC 727) may comprise various hardware elements, software elements, or a combination of both. Examples of hardware elements may include devices, logic devices, components, processors, microprocessors, circuits, processor circuits (e.g., processor circuit 102), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 700 may be implemented using single input single output (SISO) architectures. However, certain implementations may include multiple antennas (e.g., antennas 718-*f*) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 8:
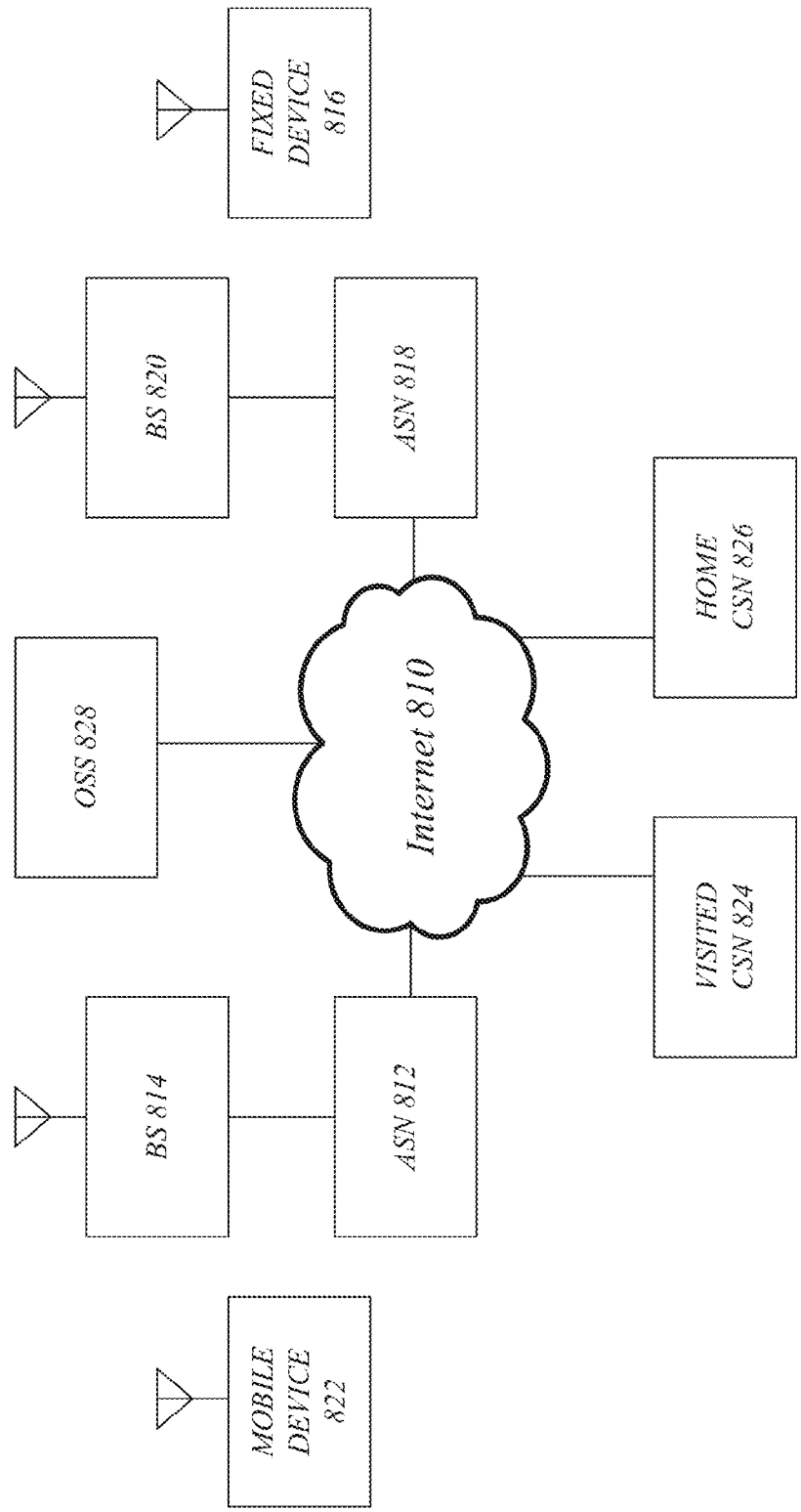
FIG. 8 illustrates one embodiment of a communications system.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 800, access service networks (ASN) 812, 818 are capable of coupling with base stations (BS) (or eNodeBs) 814, 820, respectively, to provide wireless communication between one or more fixed devices 816 and internet 810 and/or between or one or more mobile devices 822 and Internet 810. One example of a fixed device 816 and a mobile device 822 is device 700, with the fixed device 816 comprising a stationary version of device 700 and the mobile device 822 comprising a mobile version of device 700. ASNs 812, 818 may implement profiles that are capable of defining the mapping of network functions to one or more physical entities on broadband wireless access system 800. Base stations (or eNodeBs) 814, 820 may comprise radio equipment to provide RF communication with fixed device 816 and/or mobile device 822, such as described with reference to device 700, and may comprise, for example, the PHY and MAC layer equipment in compliance with a 3GPP LTE Specification or an IEEE 802.16 Standard. Base stations (or eNodeBs) 814, 820 may further comprise an IP backplane to couple to Internet 810 via ASNs 812, 818, respectively, although the scope of the claimed subject matter is not limited in these respects.

Broadband wireless access system 800 may further comprise a visited connectivity service network (CSN) 824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 824 or home CSN 826, and the scope of the claimed subject matter is not limited in these respects. Visited CSN 824 may be referred to as a visited CSN in the case where visited CSN 824 is not part of the regular service provider of fixed device 816 or mobile device 822, for example where fixed device 816 or mobile device 822 is roaming away from its respective home CSN 826, or where broadband wireless access system 800 is part of the regular service provider of fixed device 816 or mobile device 822 but where broadband wireless access system 800 may be in another location or state that is not the main or home location of fixed device 816 or mobile device 822.

Fixed device 816 may be located anywhere within range of one or both base stations (or eNodeBs) 814, 820, such as in or near a home or business to provide home or business customer broadband access to Internet 810 via base stations (or eNodeBs) 814, 820 and ASNs 812, 818, respectively, and home CSN 826. It is worthy of note that although fixed device 816 is generally disposed in a stationary location, it may be moved to different locations as needed. Mobile device 822 may be utilized at one or more locations if mobile device 822 is within range of one or both base stations (or eNodeBs) 814, 820, for example.

In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a user equipment (UE), comprising: a processor circuit; a configuration component for execution by the processor circuit to establish a connectionless small data transmission (CSDT) mode; and a communication component for execution by the processor circuit to send a small data preamble, receive a resource allocation message identifying an assigned resource, and send a small data item in the CSDT mode using the assigned resource.

In Example 2, the communication component of Example 1 may optionally be for execution by the processor circuit to receive a configuration message identifying at least one set of small data preambles and select the small data preamble from among the at least one set of small data preambles.

In Example 3, the configuration message of Example 2 may optionally identify multiple sets of small data preambles.

In Example 4, each of the multiple sets of small data preambles of Example 3 may optionally correspond to a different size range, and the communication component may optionally be for execution by the processor circuit to select one of the multiple sets based on a size of the small data item and select the small data preamble from among the selected set.

In Example 5, the configuration message of any one of Examples 2 to 4 may optionally comprise a random access channel (RACH)-ConfigCommon message.

In Example 6, the small data preamble of any one of Examples 1 to 5 may optionally comprise a random access preamble.

In Example 7, the resource allocation message of any one of Examples 1 to 6 may optionally comprise a Random Access Response message.

In Example 8, the communication component of any one of Examples 1 to 7 may optionally be for execution by the processor circuit to send the small data preamble over a random access channel.

In Example 9, the communication component of any one of Examples 1 to 8 may optionally be for execution by the processor circuit to receive CSDT mode information during an Attach procedure or a Tracking Area Update procedure, the configuration component may optionally establish the CSDT mode based on the CSDT mode information.

In Example 10, the assigned resource of any one of Examples 1 to 9 may optionally comprise a physical resource block of a physical uplink shared channel (PUSCH) subframe.

In Example 11, the communication component of any one of Examples 1 to 10 may optionally be for execution by the processor circuit to perform a backoff procedure and retransmit the small data preamble when an acknowledgment message is not received for the small data item.

In Example 12, the small data item of any one of Examples 1 to 11 may optionally comprise a periodic measurement performed by a sensor.

Example 13 is a system, comprising: a UE according to any one of Examples 1 to 12; a display; a radio frequency (RF) transceiver; and one or more RF antennas.

Example 14 is a wireless communication method, comprising: establishing, by a user equipment (UE) a connectionless small data transmission (CSDT) mode; sending a small data preamble; receiving a resource allocation message identifying an assigned resource; and sending a small data item in the CSDT mode using the assigned resource.

In Example 15, the wireless communication method of Example 14 may optionally comprise: receiving a configuration message identifying at least one set of small data preambles; and selecting the small data preamble from among the at least one set of small data preambles.

In Example 16, the configuration message of Example 15 may optionally identify multiple sets of small data preambles.

In Example 17, the wireless communication method of Example 16 may optionally comprise: selecting one of the multiple sets of small data preambles based on a size of the small data item, each of the multiple sets corresponding to a different size range; and selecting the small data preamble from among the selected set.

In Example 18, the configuration message of any one of Examples 15 to 17 may optionally comprise a random access channel (RACH)-ConfigCommon message.

In Example 19, the small data preamble of any one of Examples 14 to 18 may optionally comprise a random access preamble.

In Example 20, the resource allocation message of any one of Examples 14 to 19 may optionally comprise a Random Access Response message.

In Example 21, the wireless communication method of any one of Examples 14 to 20 may optionally comprise sending the small data preamble over a random access channel.

In Example 22, the wireless communication method of any one of Examples 14 to 21 may optionally comprise: receiving CSDT mode information during an Attach procedure or a Tracking Area Update procedure; and establishing the CSDT mode based on the CSDT mode information.

In Example 23, the assigned resource of any one of Examples 14 to 22 may optionally comprise a physical resource block of a physical uplink shared channel (PUSCH) subframe.

In Example 24, the wireless communication method of any one of Examples 14 to 23 may optionally comprise performing a backoff procedure and retransmitting the small data preamble when an acknowledgment message is not received for the small data item.

In Example 25, the small data item of any one of Examples 14 to 24 may optionally comprise a periodic measurement performed by a sensor.

Example 26 is an apparatus, comprising means for performing a wireless communication method according to any one of Examples 14 to 25.

Example 27 is a system, comprising: an apparatus according to Example 26; a display; a radio frequency (RF) transceiver; and one or more RF antennas.

Example 28 is at least one machine-readable medium comprising a set of instructions that, in response to being executed on a computing device, cause the computing device to perform a wireless communication method according to any one of Examples 14 to 25.

Example 29 is an evolved node B (eNB), comprising: processing circuitry; a communication component for execution by the processing circuitry to cause transmission of information identifying a plurality of small data preambles, receive one of the plurality of small data preambles, and cause transmission of information identifying one or more assigned radio resources for receipt of a small data item via connectionless small data transmission (CSDT).

In Example 30, the eNB of Example 29 may optionally comprise a configuration component for execution by the processing circuitry to select the plurality of small data preambles based on a CSDT scheme.

In Example 31, the communication component of any one of Examples 29 to 30 may optionally be for execution by the processing circuitry to cause transmission of a random access channel (RACH)-ConfigCommon message comprising the information identifying the plurality of small data preambles.

In Example 32, the plurality of small data preambles of any one of Examples 29 to 31 may optionally comprise at least one range of small data preambles, and the communication component may optionally be for execution by the processing circuitry to cause transmission of information identifying a first preamble in the at least one range and a number of preambles in the at least one range.

In Example 33, the plurality of small data preambles of any one of Examples 29 to 32 may optionally comprise multiple ranges of small data preambles, and each range of small data preambles may optionally correspond to different possible size range for the small data item.

In Example 34, the communication component of any one of Examples 29 to 33 may optionally be for execution by the processing circuitry to cause transmission of a Random Access Response message comprising the information identifying the one or more assigned radio resources.

In Example 35, the communication component of any one of Examples 29 to 34 may optionally be for execution by the processing circuitry to receive the small data item via the one or more assigned radio resources.

In Example 36, the configuration component of any one of Examples 30 to 35 may optionally be for execution by the processing circuitry to select the one or more assigned radio resources based on the one of the plurality of small data preambles.

In Example 37, the configuration component of Example 36 may optionally be for execution by the processing circuitry to determine a size range for the small data item based on the received one of the plurality of small data preambles and select the one or more assigned radio resources based on the determined size range.

In Example 38, the communication component of any one of Examples 29 to 37 may optionally be for execution by the processing circuitry to broadcast a message comprising the information identifying the plurality of small data preambles.

In Example 39, the one or more assigned radio resources of any one of Examples 29 to 38 may optionally comprise radio resources of a physical uplink shared channel (PUSCH).

Example 40 is a system, comprising: an eNB according to any one of Examples 29 to 39; a radio frequency (RF) transceiver; and one or more RF antennas.

Example 41 is a wireless communication method, comprising: transmitting, by an evolved node B (eNB), information identifying a plurality of small data preambles; receiving one of the plurality of small data preambles; and transmitting information identifying one or more assigned resources for receipt of a small data item via connectionless small data transmission (CSDT).

In Example 42, the wireless communication method of Example 41 may optionally comprise selecting the plurality of small data preambles based on a CSDT scheme.

In Example 43, the wireless communication method of any one of Examples 41 to 42 may optionally comprise transmitting a random access channel (RACH)-ConfigCommon message comprising the information identifying the plurality of small data preambles.

In Example 44, the plurality of small data preambles of any one of Examples 41 to 43 may optionally comprise at least one range of small data preambles, the method may optionally comprise transmitting information identifying a first preamble in the at least one range and a number of preambles in the at least one range.

In Example 45, the plurality of small data preambles of any one of Examples 41 to 44 may optionally comprise multiple ranges of small data preambles, each range of small data preambles may optionally correspond to different possible size range for the small data item.

In Example 46, the wireless communication method of any one of Examples 41 to 45 may optionally comprise transmitting a Random Access Response message comprising the information identifying the one or more assigned resources.

In Example 47, the wireless communication method of any one of Examples 41 to 46 may optionally comprise receiving the small data item via the one or more assigned resources.

In Example 48, the wireless communication method of any one of Examples 41 to 47 may optionally comprise selecting the one or more assigned resources based on the one of the plurality of small data preambles.

In Example 49, the wireless communication method of any one of Examples 41 to 48 may optionally comprise: determining a size range for the small data item based on the received one of the plurality of small data preambles; and selecting the one or more assigned resources based on the determined size range.

In Example 50, the wireless communication method of any one of Examples 41 to 49 may optionally comprise broadcasting a message comprising the information identifying the plurality of small data preambles.

In Example 51, the one or more assigned resources of any one of Examples 41 to 50 may optionally comprise resources of a physical uplink shared channel (PUSCH).

Example 52 is an apparatus, comprising means for performing a wireless communication method according to any one of Examples 41 to 51.

Example 53 is a system, comprising: an apparatus according to Example 52; a radio frequency (RF) transceiver; and one or more RF antennas.

Example 54 is at least one machine-readable medium comprising a set of instructions that, in response to being executed on a computing device, cause the computing device to perform a method according to any one of Examples 41 to 51.

Example 55 is a user equipment (UE), comprising: a processor circuit; and a communication component for execution on the processor circuit to receive a resource reservation message identifying a set of reserved resources for connectionless small data transmission (CSDT), identify a small data item for transmission using CSDT, and cause transmission of the small data item via one or more of the set of reserved resources.

In Example 56, the set of reserved resources of Example 55 may optionally comprise resources reserved specifically for the UE.

In Example 57, the set of reserved resources of Example 55 may optionally comprise a pool of resources reserved for a plurality of UEs comprising the UE.

In Example 58, the set of reserved resources of any one of Examples 55 to 57 may optionally comprise physical resource blocks in multiple subframes of at least one frame.

In Example 59, the set of reserved resources of any one of Examples 55 to 58 may optionally comprise physical resource blocks in multiple frames.

In Example 60, the resource reservation message of Example 56 may optionally identify, for each of multiple frames, a subframe comprising resources reserved for CSDT by the UE.

In Example 61, the set of reserved resources of any one of Examples 55 to 60 may optionally comprise resources of a physical uplink shared channel (PUSCH).

In Example 62, the communication component of any one of Examples 55 to 61 may optionally be for execution on the processor circuit to monitor a physical hybrid automatic repeat request (ARQ) indicator channel (PHICH) for an acknowledgment of the small data item, and when no acknowledgment of the small data item is received, perform a backoff procedure and retransmit the small data item.

In Example 63, the communication component of any one of Examples 55 to 62 may optionally be for execution on the processor circuit to receive CSDT mode information during an Attach procedure or a Tracking Area Update procedure.

In Example 64, the UE of Example 63 may optionally comprise a configuration component for execution on the processor circuit to establish a CSDT mode based on the CSDT mode information.

Example 65 is a system, comprising: a UE according to any one of Examples 55 to 64; a display; a radio frequency (RF) transceiver; and one or more RF antennas.

Example 66 is a wireless communication method, comprising: receiving, by a user equipment (UE), a resource reservation message identifying a set of reserved resources for connectionless small data transmission (CSDT); identifying a small data item for transmission using CSDT; and transmitting the small data item via one or more of the set of reserved resources.

In Example 67, the set of reserved resources of Example 66 may optionally comprise resources reserved specifically for the UE.

In Example 68, the set of reserved resources of Example 66 may optionally comprise a pool of resources reserved for a plurality of UEs comprising the UE.

In Example 69, the set of reserved resources of any one of Examples 66 to 68 may optionally comprise physical resource blocks in multiple subframes of at least one frame.

In Example 70, the set of reserved resources of any one of Examples 66 to 69 may optionally comprise physical resource blocks in multiple frames.

In Example 71, the resource reservation message of Example 67 may optionally identify, for each of multiple frames, a subframe comprising resources reserved for CSDT by the UE.

In Example 72, the set of reserved resources of any one of Examples 66 to 71 may optionally comprise resources of a physical uplink shared channel (PUSCH).

In Example 73, the wireless communication method of any one of Examples 66 to 72 may optionally comprise: monitoring a physical hybrid automatic repeat request (ARQ) indicator channel (PHICH) for an acknowledgment of the small data item; and when no acknowledgment of the small data item is received, performing a backoff procedure and retransmitting the small data item.

In Example 74, the wireless communication method of any one of Examples 66 to 73 may optionally comprise receiving CSDT mode information during an Attach procedure or a Tracking Area Update procedure.

In Example 75, the wireless communication method of Example 74 may optionally comprise establishing a CSDT mode based on the CSDT mode information.

Example 76 is an apparatus, comprising means for performing a wireless communication method according to any one of Examples 66 to 75.

Example 77 is a system, comprising: an apparatus according to Example 76; a display; a radio frequency (RF) transceiver; and one or more RF antennas.

Example 78 is at least one machine-readable medium comprising a set of instructions that, in response to being executed on a computing device, cause the computing device to perform a wireless communication method according to any one of Examples 66 to 75.

Example 79 is an evolved node B (eNB), comprising: a processor element; a configuration component for execution by the processor element to reserve one or more radio resources for connectionless small data transmission (CSDT); and a communication component for execution by the processor element to send a resource reservation message identifying the one or more reserved resources, and receive a small data item via at least one of the one or more reserved resources.

In Example 80, the resource reservation message of Example 79 may optionally comprise a unicast message, and the one or more reserved radio resources may optionally comprise radio resources reserved specifically for a particular user equipment (UE).

In Example 81, the resource reservation message of Example 79 may optionally comprise a broadcast message, and the one or more reserved radio resources may optionally comprise a pool of radio resources reserved for a plurality of user equipment (UEs).

In Example 82, the one or more reserved radio resources of any one of Examples 79 to 81 may optionally comprise physical resource blocks in multiple subframes of at least one frame.

In Example 83, the one or more reserved radio resources of any one of Examples 79 to 82 may optionally comprise physical resource blocks in multiple frames.

In Example 84, the resource reservation message of Example 80 may optionally identify, for each of multiple frames, a subframe comprising radio resources reserved for CSDT by the particular UE.

In Example 85, the one or more reserved radio resources of any one of Examples 79 to 84 may optionally comprise radio resources of a physical uplink shared channel (PUSCH).

In Example 86, the communication component of any one of Examples 79 to 85 may optionally be for execution by the processor element to send an acknowledgment (ACK) of the small data item over a physical hybrid automatic repeat request (ARQ) indicator channel (PHICH).

In Example 87, the communication component of Example 80 may optionally be for execution by the processor element to perform an Attach procedure or Tracking Area Update procedure for the particular UE.

In Example 88, the communication component of Example 87 may optionally be for execution by the processor element to send the resource reservation message during the Attach procedure or Tracking Area Update procedure.

Example 89 is a system, comprising: a UE according to any one of Examples 79 to 88; a display; a radio frequency (RF) transceiver; and one or more RF antennas.

Example 90 is a wireless communication method, comprising: reserving, by an evolved node B (eNB), one or more radio resources for connectionless small data transmission (CSDT); sending a resource reservation message identifying the one or more reserved resources; and receiving a small data item via at least one of the one or more reserved resources.

In Example 91, the resource reservation message of Example 90 may optionally comprise a unicast message, and the one or more reserved radio resources may optionally comprise radio resources reserved specifically for a particular user equipment (UE).

In Example 92, the resource reservation message of Example 90 may optionally comprise a broadcast message, and the one or more reserved radio resources may optionally comprise a pool of radio resources reserved for a plurality of user equipment (UEs).

In Example 93, the one or more reserved radio resources of any one of Examples 90 to 92 may optionally comprise physical resource blocks in multiple subframes of at least one frame.

In Example 94, the one or more reserved radio resources of any one of Examples 90 to 93 may optionally comprise physical resource blocks in multiple frames.

In Example 95, the resource reservation message of Example 91 may optionally identify, for each of multiple frames, a subframe comprising radio resources reserved for CSDT by the particular UE.

In Example 96, the one or more reserved radio resources of any one of Examples 90 to 95 may optionally comprise radio resources of a physical uplink shared channel (PUSCH).

In Example 97, the wireless communication method of any one of Examples 90 to 96 may optionally comprise sending an acknowledgment (ACK) of the small data item over a physical hybrid automatic repeat request (ARQ) indicator channel (PHICH).

In Example 98, the wireless communication method of Example 91 may optionally comprise performing an Attach procedure or Tracking Area Update procedure for the particular UE.

In Example 99, the wireless communication method of Example 98 may optionally comprise sending the resource reservation message during the Attach procedure or Tracking Area Update procedure.

Example 100 is an apparatus, comprising means for performing a wireless communication method according to any one of Examples 90 to 99.

Example 101 is a system, comprising: an apparatus according to Example 100; a radio frequency (RF) transceiver; and one or more RF antennas.

Example 102 is at least one machine-readable medium comprising a set of instructions that, in response to being executed on a computing device, cause the computing device to perform a wireless communication method according to any one of Examples 90 to 99.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A user equipment (UE), comprising:
a processor circuit;
a configuration component for execution by the processor circuit to establish a connectionless small data transmission (CSDT) mode; and
a communication component for execution by the processor circuit to:
receive a resource reservation message indicating a pattern describing a set of reserved resources for CSDT, the set of reserved resources to comprise respective reserved resources of each of a plurality of radio frames including a first radio frame and a second radio frame, at least a portion of the reserved resources of each of the first and second radio frames reserved for the UE for CSDT;
send a small data item in the CSDT mode using reserved resources of the first radio frame; and
when an acknowledgment message is not received for the small data item, perform a backoff procedure and retransmit the small data item in the CSDT mode using reserved resources of the second radio frame.

2. The UE of claim 1, the communication component for execution by the processor circuit to receive a configuration message identifying at least one set of small data preambles and select the small data preamble from among the at least one set of small data preambles.

3. The UE of claim 2, the configuration message identifying multiple sets of small data preambles.

4. The UE of claim 3, each of the multiple sets of small data preambles corresponding to a different size range, the communication component for execution by the processor circuit to select one of the multiple sets based on a size of the small data item and select the small data preamble from among the selected set.

5. The UE of claim 1, the set of reserved resources comprising physical resource blocks of a physical uplink shared channel (PUSCH).

6. The UE of claim 1, the small data item comprising a periodic measurement performed by a sensor.

7. A system, comprising:
the UE of claim 1;
a display;
a radio frequency (RF) transceiver; and
one or more RF antennas.

8. The UE of claim 1, the pattern comprising a repeating pattern describing a set of reserved resources for CSDT.

9. A computer-implemented method, comprising:
receiving a resource reservation message indicating a pattern describing a set of reserved resources for connectionless small data transmission (CSDT), the set of reserved resources to comprise respective reserved resources of each of a plurality of radio frames including a first radio frame and a second radio frame, at least a portion of the reserved resources of each of the first and second radio frames reserved for a user equipment (UE) for CSDT;
identifying a small data item for transmission using CSDT;
transmitting, using CSDT, the small data item using reserved resources of the first radio frame;
monitoring a physical hybrid automatic repeat request (ARQ) indicator channel (PHICH) for an acknowledgment of the small data item; and
when no acknowledgment of the small data item is received, performing a backoff procedure and retransmitting, using CSDT, the small data item using reserved resources of the second radio frame.

10. The computer-implemented method of claim 9, the set of reserved resources comprising resources reserved specifically for the UE.

11. The computer-implemented method of claim 10, the resource reservation message identifying, for each of the plurality of radio frames, a subframe comprising resources reserved for CSDT by the UE.

12. The computer-implemented method of claim 9, the set of reserved resources comprising a pool of resources reserved for a plurality of UEs comprising the UE.

13. The computer-implemented method of claim 9, the set of reserved resources comprising physical resource blocks in multiple subframes of at least one of the plurality of radio frames.

14. The computer-implemented method of claim 9, the set of reserved resources comprising resources of a physical uplink shared channel (PUSCH).

15. The computer-implemented method of claim 9, the pattern comprising a repeating pattern describing a set of reserved resources for CSDT.

16. An evolved node B (eNB) comprising:
logic, at least a portion of which is in hardware, the logic to:
send a resource reservation message indicating a pattern describing a set of reserved resources for connectionless small data transmission (CSDT), the set of reserved resources to comprise respective reserved resources of each of a plurality of radio frames including a first radio frame and a second radio frame, at least a portion of the reserved resources of each of the first and second radio frames reserved for a user equipment (UE) for CSDT;
receive a small data item transmitted using CSDT from the user equipment (UE) via one or more of the set of reserved resources; and
send an acknowledgment of the small data item over a physical hybrid automatic repeat request (ARQ) indicator channel (PHICH).

17. The eNB of claim 16, the one or more reserved resources comprising resources reserved specifically for the UE.

18. The eNB of claim 17, the resource reservation message identifying, for each of the plurality of radio frames, a subframe comprising resources reserved for CSDT by the UE.

19. The eNB of claim 16, the set of reserved resources comprising a pool of resources reserved for a plurality of UEs comprising the UE.

20. The eNB of claim 16, the set of reserved resources comprising physical resource blocks in multiple subframes of at least one of the plurality of radio frames.

21. The eNB of claim 16, the set of reserved resources comprising resources of a physical uplink shared channel (PUSCH).

22. The eNB of claim 16, comprising:
at least one radio frequency (RF) transceiver; and
at least one RF antenna.

23. The eNB of claim 16, the pattern comprising a repeating pattern describing a set of reserved resources for CSDT.

\* \* \* \* \*